R. G. LECKIE.

Improvement in Apparatus for Evaporating Brine.

No. 123,181.

Patented Jan. 30, 1872.

UNITED STATES PATENT OFFICE.

ROBERT G. LECKIE, OF MONTREAL, CANADA.

IMPROVEMENT IN APPARATUS FOR EVAPORATING BRINE.

Specification forming part of Letters Patent No. 123,181, dated January 30, 1872.

SPECIFICATION.

*To all whom it may concern:*

Be it known that I, ROBERT GILMOUR LECKIE, of the city of Montreal, in the district of Montreal, in the province of Quebec, Canada, have invented new and useful "Improvements on the Apparatus used in the Concentration of Brine;" and I do hereby declare that the following is a full, clear, and exact description of the construction and operation of the same, reference being had to the annexed drawing, where—

Figure 1:
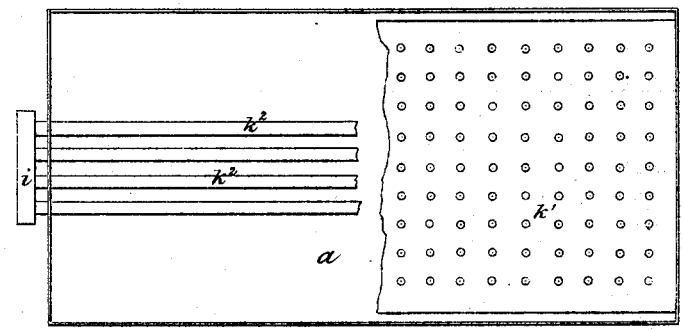
Figure 2:
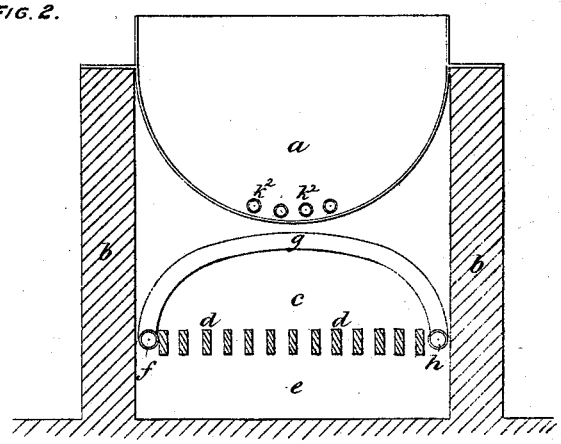
Figure 3:
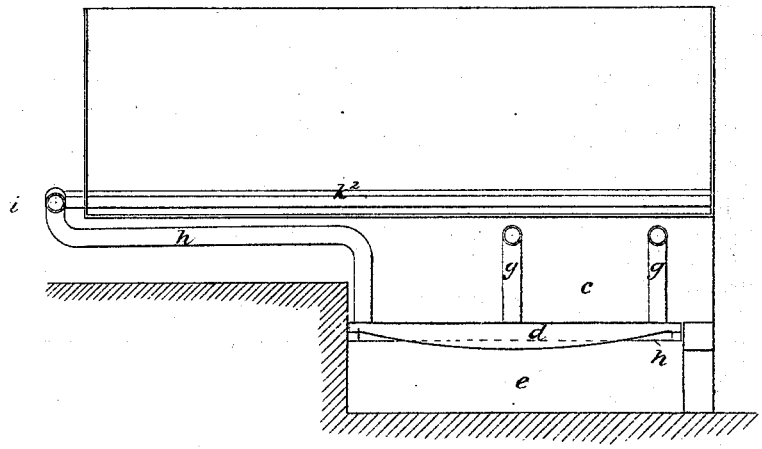

Figure 1 represents a plan of apparatus. Fig. 2 represents a transverse section of apparatus. Fig. 3 represents a longitudinal section.

This invention has reference to improvements on apparatus for concentrating brine, to obviate the defect found to exist in the ordinary apparatus used for that purpose—i. e., that the sulphate of lime present in the brine and precipitated by the action of heat and ebullition falls to the bottom of the pan or vessel in which the manufacture of the brine is being carried on, and forms a hard deposit, which, being an almost perfect non-conductor, diminishes very much the action of the fire upon the brine and delays the process of concentration, beside causing a great waste of fuel. The ordinary way of cleaning the vessel is also tedious, and entails an entire cessation of the work. To obviate these disadvantages by preventing the adhesion of the deposit of sulphate of lime on the bottom of the vessel is the object of my invention.

In the drawing, similar letters of reference indicate like parts.

Letter $a$ is the pan or vessel, of any convenient or ordinary form, and built in brick in the usual way, $b\ b$ being the side walls which support it. $c$ is the fire-box, $d\ d$ the fire-bars, and $e$ the ash-pit, all of ordinary construction. Running longitudinally with the fire-bars $d$ is a pipe, $f$, communicating with any usual blower and serving for the introduction of the cold air to be heated. From this pipe spring any convenient number of other pipes, $g\ g$, arching over the fire and inserted at the other end into another longitudinal pipe, $h$, which at the bridge of the furnace is turned and, passing along the top of the flue, terminates in a cross-pipe, $i$, brought to the same curve as the bottom of the pan $a$, into which are let the ends of the perforated pipes $k^2$, which run the whole length of the pan somewhat closely to the bottom.

The operation of my invention is as follows: The air forced into the pipe $f$ is highly heated by its passage through the arched pipes $g$ and longitudinal pipe $h$, enters the cross-pipe $i$, and thence passes into the perforated pipes $k^2$, through the apertures in which it enters the brine, causing that in the lower part of the vessel to be in a constant state of ebullition and disturbance, and thus preventing the adhesion of the deposit of sulphate of lime to the bottom of the pan. The pipes $f$, $g$, $h$, and $i$ may be found unnecessary, in which case the air would be forcibly introduced into the pipe $k^2$ or chamber $k$, being sufficiently heated by the action of the fire while in the pan.

Having thus described the construction and operation of my invention, to which I have given the name of "Leckie's Improvements on the Apparatus used in the Concentration of Brine," what I claim as my invention, and wish secured by Letters Patent, is—

A system of perforated pipes located in close contact with the bottom of the evaporating-vessel and adapted to discharge currents of air against the bottom, for the purpose of preventing the deposition of sulphate of lime, as described.

Montreal, 30th day of May, A. D. 1871.

ROBERT G. LECKIE.

Witnesses:
CHARLES LEGGE,
CHARLES G. C. SIMPSON.